Sept. 23, 1930.  W. A. MacDONALD  1,776,592

GENERATOR FREQUENCY CONTROL

Filed Nov. 16, 1927

INVENTOR
William A. MacDonald
BY
ATTORNEYS

Patented Sept. 23, 1930

1,776,592

UNITED STATES PATENT OFFICE

WILLIAM A. MacDONALD, OF LITTLE NECK, NEW YORK, ASSIGNOR TO HAZELTINE CORPORATION, OF JERSEY CITY, NEW JERSEY, A CORPORATION OF DELAWARE

GENERATOR FREQUENCY CONTROL

Application filed November 16, 1927. Serial No. 233,649.

This invention relates to the control of electric generators and has particular reference to the control of high-frequency electric alternators such as those used in electric signaling systems. It is the principal object of this invention to provide a method and means for controlling the speed or frequency of any mechanism undergoing a periodic cycle, and as the frequency of alternators, for example, is dependent on the driving speed thereof, a more particular object of this invention is to provide a sensitive and highly accurate means for controlling the speed of rotation of an alternator according to the output frequency thereof.

In radio communication systems employing alternators which often operate at frequencies as high as 100,000 cycles per second, it has been found practicable to connect the alternator directly to the prime mover, such as an electric motor or other driving means. Consequently, if there is any variation in the speed of the driving means caused by changes of load or changes in the power supplied thereto, a variation in the generated frequency of the alternator results. Inasmuch as the sources of error affecting the frequency of the generator are numerous, it has been found advisable heretofore to supply as many means to compensate for such errors, such sources of error being in variation in the load condition of the alternator, variation in the supply source of the driving motor, and the like.

A number of expedients have previously been employed to effect the necessary compensation for the errors inherent in the operation of such apparatus, but all of these are comparatively insensitive, whereby the desired output frequency of the alternator is not maintained within close limits. I have found by actual measurements that the accuracy of such frequency controls for the long-wave, high-power radio transmitting systems is between 1/20th and 1/10th of one percent, or for frequencies in the neighborhood of 20,000 cycles per second, a variation as high as 20 cycles per second is detectable. Although frequency variations of this order are ordinarily not harmful, nevertheless in some instances they seriously interfere with not only the transmission efficiency, but also the reception efficiency of the entire communication network.

In accordance with the present invention, an accurate frequency control may be maintained by the use of an harmonic generator to supply a correction factor to compensate for the irregularities in supply or load conditions causing the frequency variations; and this invention is concerned with the method and apparatus for utilizing such an harmonic generator in the circuit between the alternator and the driving motor regulating means, such as the magnetic field thereof. Inasmuch as an harmonic generator operates on the principle of an harmonic progression, each successive harmonic is an arithmetic complement of the fundamental frequency, and it is therefore evident that any value such as change in frequency as a factor of error is multiplied through the harmonic generator which accordingly exerts a multiplied correction factor to rapidly and accurately control the alternator driving means.

In addition to the advantages above-mentioned, a further source of accuracy in frequency control resides in the fact that the minimum and maximum, or limiting, frequencies are in themselves high frequencies; whereby the control circuits may be tuned sharply to these high frequencies.

A better understanding of the invention may be had by reference to the accompanying drawings in which—

Figure 1:
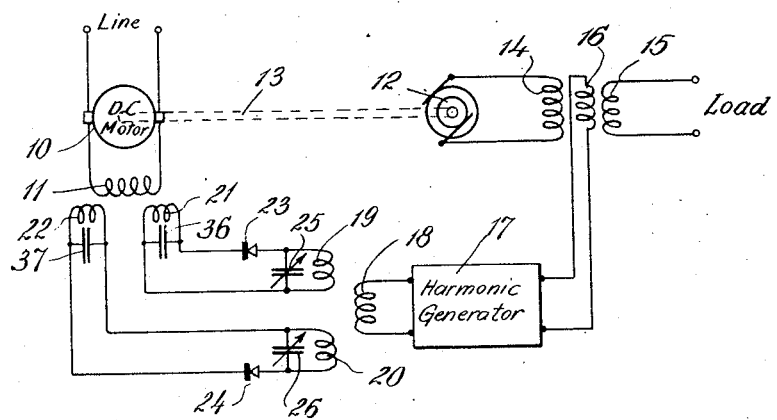
Figure 1 is a diagrammatic representation of an electrical transmitting structure embodying my invention.
Figure 3:
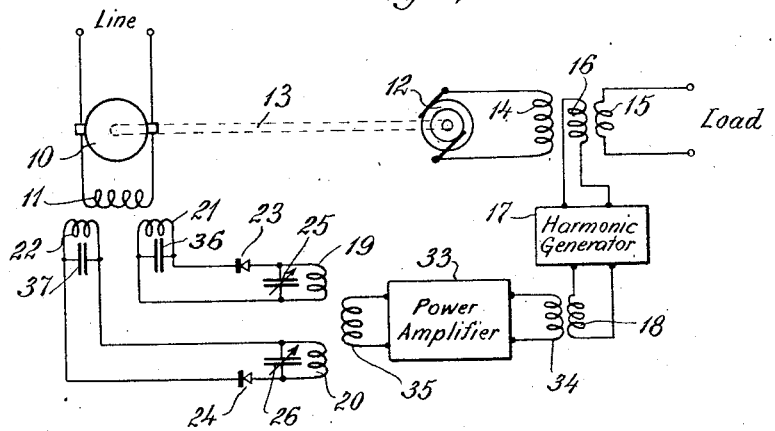

Figure 3 diagrammatically illustrates the use of a power amplifier in the circuit of Figure 1 in order to amplify an unusually high harmonic frequency so as to provide sufficient power to control the driving means.

Referring now to Fig. 1, reference character 10 designates a direct-current motor operating from a power supply line, and although illustrated as having a shunt field 11, any other type of suitable field-winding may be employed equally well. The motor 10 is preferably directly connected to alternator 12 by means of a shaft 13, this alternator having an output transformer of which winding 14 is the primary, and winding 15 is a secondary connected to the output or load circuit. This transformer is coupled through winding 16 to the harmonic generator 17 having an output transformer comprising primary winding 18 inductively coupled to secondary windings 19 and 20. The circuits of secondary windings 19 and 20 may be called the "control circuits" or the "rectifier circuits", and are inductively coupled to the field-winding 11 of the driving motor 10 by means of two large inductances 21 and 22, respectively. Under usual conditions, the auxiliary windings 21 and 22 would be placed symmetrically upon the field poles which contain the shunt field-winding 11 of the motor. The input windings 19 and 20 are intended to be sharply tuned to the limiting frequencies within which the control system is intended to operate, such as by adjustable condensers 25 and 26. Ordinarily, the capacity values of these condensers may be permanently fixed after the proper adjustment has been found. It is in the provision of tuned circuits 19, 25 and 20, 26 that this invention introduces an additional source of accuracy in the frequency control by reason of the fact that it is possible to design for high frequencies tuned circuits having a very sharp response/frequency-curve peak; whereas, with the lower frequencies a sharp resonance peak can not be so easily obtained. In this manner, the frequency at which each control circuit operates may be precisely determined.

Each control circuit includes a rectifier 23 and 24, respectively, and an output winding 21 and 22 shunted by a condenser 36 and 37, preferably of the by-pass type, to complete the alternating-current circuits of the rectifiers. These by-pass condensers, in combination with the high-impedance windings 21 and 22, provide a filter whereby practically pure direct current is caused to flow through these auxiliary field-windings 21 and 22, while alternating-current components of the harmonic-frequency currents flow through the by-pass condensers 36 and 37. Auxiliary coils 21 and 22 are inductively so related to each other and to the motor field-winding 11 that the magnetic fields of the auxiliary coils are in opposition to each other and are superimposed upon the field of the motor 10, whereby the motor field is either strengthened or weakened, according to which auxiliary winding carries the more current.

In general, the operation of such control circuits may be explained as follows neglecting, for simplicity, the action of the harmonic generator 17: Assuming a convenient example, let the alternator produce F cycles and let the control circuit 19, 21 be tuned to (F+$f$) cycles, and control circuit 20, 22 be tuned to (F−$f$) cycles, in which $f$ equals the allowable frequency variation. If the voltage to the driving motor is decreased, or the load is increased, the motor will slow down, and consequently the alternator also, thereby causing a tendency for the output frequency to decrease. As the output frequency gradually drops and comes into resonance with circuit 20, 26 tuned to (F−$f$) frequency, energy is supplied to this circuit, and a voltage of (F−$f$) frequency is established across the rectifier element 24. The pulsating direct current which then flows through the rectifier circuit is in effect filtered by the action of the series inductance 22 and shunt capacity 37, whereby a direct-current field is established around the winding 22. The polarity of winding 22 is such that its magnetic field tends to oppose the magnetic field of the motor shunt field-winding 11, whereby the speed of the driving motor, and of the alternator, is increased, thus causing an increase in the alternator frequency. As the alternator frequency increases it comes into resonance with the circuit 19, 25 tuned to (F+$f$) frequency. A corresponding action now takes place in control circuit 19, 21; but since the polarity of winding 21 is such that the magnetic field of that winding aids the magnetic field of the motor shunt field-winding, the motor speed is reduced until the output frequency again reaches the minimum allowed, or limiting, value of (F−$f$) frequency.

In describing the operation of the frequency control system of this invention which introduces the improved control by virtue of the use of harmonics, a typical example of operation will be referred to in which it is assumed that motor 10 is driving alternator 12 at a speed to develop 20,000 cycles. The alternator 12 accordingly supplies energy at this frequency to the harmonic generator 17 through the input winding 16 coupled to output winding 14 of the alternator 12. If the harmonic generator 17 is adjusted to accentuate the tenth harmonic of 20,000 cycles the output 18 of the harmonic generator 17 will supply energy at a frequency of 200,000 cycles. Employing the same nomenclature as heretofore, let F represent the output frequency of the harmonic generator 17, and $f$ represent the allowable frequency variation. The two tuned circuits including inductances 19 and 20, which are coupled to harmonic generator output 18, are tuned by condensers 25 and 26, respectively, to the allowable frequency variation, one of these tuned circuits, say 19, being sharply tuned to (F+$f$) cycles and the other, 20, being sharply tuned to (F−$f$) cycles, while the magnetic fields of inductances 21 and 22 are balanced. If for any reason at all, such as a change in load or line conditions, a decrease in the frequency output of alternator 12 of $f$ cycles is caused, a corresponding decrease in the frequency output of the harmonic generator 17 would amount to 10F cycles. This would in turn be picked up by that tuned circuit which is tuned to the negative frequency value, namely circuit 20, 26, thereby causing the unbalancing of inductances 21 and 22 with a corresponding unbalance on the opposed field-winding 11 of the driving motor to decrease its field, whereby the speed of driving motor 10 is increased to increase the frequency output of alternator 12, since the latter is directly connected to motor 10. Conversely, if the generated frequency is increased due to similar causes, the reverse action will take place to decrease the generated frequency by unbalancing the windings 21, 22 in the opposite sense, whereby the motor field is effectively increased by the aiding flux of winding 21.

In especially large transmitting systems it may be more desirable to indirectly control the field strength, and hence the speed, of the driving motor. This may be accomplished by energizing the main field of the driving motor by means of an exciting generator which in turn may have its field partially or wholly controlled by the harmonic generator. By this method the output of the exciting generator acts in the explained manner upon the field of the driving motor to accomplish the desired results.

This system of frequency control is particularly useful in controlling the frequency of alternators which are used in conjunction with frequency multipliers. Assume that an alternator generating 30,000 cycles has under normal operation an accuracy of control of 1/10th of one per cent, or 30 cycles. Assume further that this ouput is supplied to a frequency doubler, tripler or two doublers, then with the normal control, the frequency variation of the final output might be 60 cycles, 90 cycles, or 120 cycles. By utilizing the present invention, however, and operating upon the 10th harmonic of the original generator the frequency control may be corrected to 1/100th of one per cent, or 6 cycles, 9 cycles, or 12 cycles, as the case may be. This accuracy may be further increased by operating directly from the antenna-output circuit, by a factor equivalent to the frequency of the multiplier employed.

Accordingly this invention provides a novel and most efficient method and apparatus for controlling generators, and particularly the high-frequency alternators such as are used in high-frequency communication. The use of an harmonic generator as applied to frequency control of alternators in which differential fields are used, or any of the known systems of utilizing a portion of the output energy from a generator to control or adjust variations in the frequency, provides a correction factor equivalent to the order of the harmonic frequency employed. To illustrate this point, if in a transmitting system an actual frequency variation of 1/10th of one percent, or 20 cycles, were measured, a correction resulting in a change of only 1/100th of one percent, or 2 cycles, could be obtained by utilizing the control system of this invention. Thus the frequency variations are multiplied according to the harmonic principle so that an accurate and rapid control, not heretofore possible, is attained.

The explanation given above appears to imply that the speed of the generator is constantly varying within the limits of frequency determined by the tuned circuits 20, 26 and 19, 25. In actual operation, however, it is usually observed that in any given generator installation designed for certain known load conditions, the load itself often acts either as a minimum or maximum frequency control. For example, the installation might be so designed that with normal load and normal power-line voltage the generated frequency would be correct, but that upon decrease of the load the frequency would tend to increase. Under these circumstances, the load itself might be considered to be the minimum frequency control, and the control circuit 19, 21 the maximum frequency control. However, the present invention contemplates the provision of both minimum frequency and maximum frequency controls, whereby the operating frequency limits are definitely determined regardless of the many varying factors which have been found by common experience to influence the generated frequency.

Figure 2:
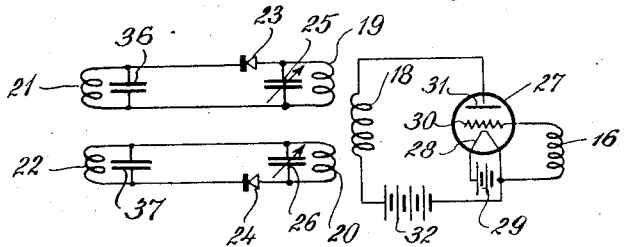
Figure 2 is a detailed diagram of one form of an harmonic generator.

Figure 2 illustrates one form of arranging the harmonic generator 17, and in which the coupling and control circuits are also shown. In this form of harmonic generator a vacuum tube 27 may be employed, provided with the filament 28 energized from battery 29. Plate 31 is connected in circuit with battery 32, and output primary winding 18. The grid 30, alternator coupling winding 16, and filament 28 comprise the input circuit of the harmonic generator. In this manner the grid or input circuit is coupled to the output of the fundamental generator 12, and thus by inductive means, although any other suitable coupling would be as satisfactory, this coupling provides sufficient voltage to overload the vacuum tube 27 and provides in the output winding 18 a distorted wave having harmonic frequencies. Although the use of a three-electrode vacuum tube has been illustrated and described, it is to be understood that the harmonic generator 17 may be of any suitable form such as a magnetic frequency multiplier, a two-electrode vacuum tube circuit, or the like.

In cases where an unusually constant frequency is desired, it may be necessary to operate with a correction factor requiring a very high harmonic frequency, but such a frequency may not be of sufficient amplitude to directly actuate the control means of the driving motor. In such a case the output of the harmonic generator may be amplified to any value required by a power amplifier of a suitable form, and preferably of the neutralized type, although it is not essential that the amplifier be of the latter type. A circuit utilizing a power amplifier is illustrated in Figure 3, in which the amplifier 33 is shown interposed between the output of the harmonic generator 17 and the inputs 19 and 20 of the control or tuned circuits, the coupling windings therefor being designated 34 and 35, respectively. The remainder of the circuit of Figure 3 is identical with that shown in Figure 1 and described in connection therewith. It is desirable that the power amplifier 33 when placed as shown in Figure 3, be designed so as to have a flat-top amplification characteristic curve for the allowable frequency variations, in order that proportional amplification will be obtained.

I claim:

1. A system comprising an alternator and a prime mover for driving said alternator, said alternator having a fluctuating output the normal frequency of which is of constant value, an harmonic generator connected to said alternator and operable to utilize the fluctuating current therefrom to produce voltage and current of an harmonic frequency, two parallel circuits associated with the output of said harmonic generator, one of said circuits being tuned to a frequency slightly higher than the normal harmonic frequency, the other of said circuits being tuned to a frequency slightly lower than the harmonic frequency whereby one of said circuits is increasingly energized in response to an increase in the speed of said alternator while the other is decreasingly energized and vice versa, and means for regulating the speed of said prime mover, said means being responsive to increased energization of one of said circuits to increase the speed of said prime mover and responsive to increased energization of the other of said circuits to decrease the speed of said prime mover.

2. In an alternator frequency-correcting apparatus including but a single source of alternating current, means for increasing the correction factor comprising an harmonic generator coupled to the alternator output, means for detecting a change in the output frequency of the harmonic generator, and an alternator frequency-regulating device controlled by said means in proportion to the order of said harmonic frequency.

3. Apparatus for controlling the frequency of an alternator generating a normal frequency, comprising an harmonic generator coupled to the output side of said alternator and generating an harmonic of the alternator frequency, said harmonic generator being coupled to only two balanced circuits tuned to different frequencies near and differing from said harmonic frequency and adapted to be unbalanced with respect to each other by a change in harmonic frequency, and a generator-regulating means controlled by the unbalancing of said circuits.

4. Apparatus for controlling the frequency of an alternator intended to generate a normal frequency, said alternator being the sole source of alternating current in said apparatus, comprising an harmonic generator coupled to the output side of said alternator and generating an harmonic of the alternator frequency, said harmonic generator being coupled to an amplifying device adapted to amplify uniformly frequencies of the order of said harmonic frequency, said amplifying device being coupled to only two balanced circuits, one tuned to a frequency slightly lower and the other tuned to a frequency slightly higher than said harmonic frequency, said circuits being adapted to be unbalanced by a change in harmonic frequency, and means operable in proportion to the unbalance of said circuits for regulating the output frequency of said alternator in proportion to the ratio of said normal generator frequency to said harmonic frequency.

5. Apparatus for controlling the frequency of an alternator, said alternator being the sole source of alternating current in said apparatus, including electric driving means therefor, an harmonic generator coupled to the alternator output, and a plurality of rectifying circuits coupled between said driving means and said harmonic generator, each of said circuits being tuned to a different harmonic frequency corresponding to a definite frequency deviation from the normal generator-output frequency, and control means associated with said driving means coupled to said circuits, whereby the alternator frequency is automatically controlled in proportion to the order of said harmonic frequency.

6. In an alternating-current generating system comprising an alternator driven by a motor whose speed regulation is controlled automatically by the alternator frequency, means for increasing the accuracy of speed regulation comprising an harmonic generator whose input is electrically coupled to the alternator and whose output is electrically coupled to speed-regulation means for said motor, whereby a given variation in alternator frequency effects a speed regulation proportional to the ratio of the alternator frequency to the harmonic frequency.

7. Apparatus for controlling the frequency of an alternator, including an electric driving motor therefor, said motor having a field winding and two rectifying circuits coupled to said alternator, said circuits being tuned respectively to certain minimum and maximum limiting frequencies which are harmonics of the chosen minimum and maximum alternator frequencies, said circuits being differentially coupled to each other and to the motor field winding, whereby the speed and, hence, the frequency of said alternator is automatically controlled in proportion to the order of the average harmonic frequency.

In testimony whereof I affix my signature.

WILLIAM A. MacDONALD.